United States Patent
Matsutani

(10) Patent No.: US 9,369,178 B2
(45) Date of Patent: Jun. 14, 2016

(54) PLC/POWER-SUPPLY HYBRID DEVICE AND DEVICE WITH COMMUNICATION FUNCTION

(75) Inventor: Takashi Matsutani, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 545 days.

(21) Appl. No.: 13/824,684

(22) PCT Filed: May 23, 2011

(86) PCT No.: PCT/JP2011/061733
§ 371 (c)(1),
(2), (4) Date: Mar. 18, 2013

(87) PCT Pub. No.: WO2012/053244
PCT Pub. Date: Apr. 26, 2012

(65) Prior Publication Data
US 2013/0182781 A1 Jul. 18, 2013

(30) Foreign Application Priority Data
Oct. 20, 2010 (JP) ................................ 2010-235442

(51) Int. Cl.
*H04B 3/54* (2006.01)

(52) U.S. Cl.
CPC ................. *H04B 3/54* (2013.01); *H04B 3/548* (2013.01); *H04B 2203/547* (2013.01)

(58) Field of Classification Search
CPC ..... H04B 3/54; H04B 3/548; H04B 2203/547
See application file for complete search history.

(56) References Cited

U.S. PATENT DOCUMENTS

| | | | |
|---|---|---|---|
| 4,468,792 A * | 8/1984 | Baker et al. | 375/272 |
| 6,909,943 B2 * | 6/2005 | Lehr et al. | 700/286 |
| 7,906,941 B2 * | 3/2011 | Jayaraman et al. | 323/222 |
| 8,781,595 B2 * | 7/2014 | Grevious et al. | 607/60 |

(Continued)

FOREIGN PATENT DOCUMENTS

| | | |
|---|---|---|
| CN | 1756111 A | 4/2006 |
| CN | 200976505 Y | 11/2007 |

(Continued)

OTHER PUBLICATIONS

Stefanutti et al. "Communication on Power Lines Using Frequency and Duty-Cycle Modulation in digitally Controlled DC-DC Coverters", Apr. 2008, Industrial Electronics, IEEE Transactions on (vol. 55, Issue:4), pp. 2144-2149.*

(Continued)

*Primary Examiner* — Zeev V Kitov
(74) *Attorney, Agent, or Firm* — Oblon, McClelland, Maier & Neustadt, L.L.P.

(57) ABSTRACT

A PLC/power-supply hybrid device includes a power supply circuit. The power supply circuit includes a switching part for chopping a voltage of a voltage input terminal side, and a control circuit that controls the chopping by controlling switching of the switching part. The control circuit is operated in a normal mode and a transmission mode. The normal mode is a mode in which voltage conversion is performed. The transmission mode is a mode in which data transmission is performed through PLC using a power line that leads to the voltage input terminal. In the transmission mode, the control circuit modulates the switching of the switching part in accordance with transmission data.

18 Claims, 6 Drawing Sheets

(56) References Cited

U.S. PATENT DOCUMENTS

| | | | |
|---|---|---|---|
| 8,823,499 B2* | 9/2014 | Franco et al. | 340/12.32 |
| 2005/0099827 A1* | 5/2005 | Sase et al. | 363/16 |
| 2005/0143868 A1* | 6/2005 | Whelan | 701/1 |
| 2010/0079649 A1* | 4/2010 | Ayraud | 348/308 |
| 2011/0309838 A1* | 12/2011 | Lin et al. | 324/427 |

FOREIGN PATENT DOCUMENTS

| | | |
|---|---|---|
| JP | 2000 41071 | 2/2000 |
| JP | 2004 304747 | 10/2004 |
| JP | 2005 269553 | 9/2005 |
| JP | 2006 94308 | 4/2006 |
| JP | 2007 5982 | 1/2007 |
| JP | 2008 227837 | 9/2008 |

OTHER PUBLICATIONS

Office Action issued on Jan. 19, 2015 in the corresponding Chinese Patent Application No. 2011800506643 (with partial English Translation).

U.S. Appl. No. 13/882,896, filed May 1, 2013, Matsutani.

International Preliminary Report on Patentability Issued Apr. 30, 2012 in PCT/JP11/61733 Filed May 23, 2011.

International Search Report Issued Jun. 21, 2011 in PCT/JP11/61733 Filed May 23, 2011.

Combined Office Action and Search Report issued Apr. 30, 2014, in Chinese Patent Application No. 2011800506643 with English and Japanese translations.

* cited by examiner

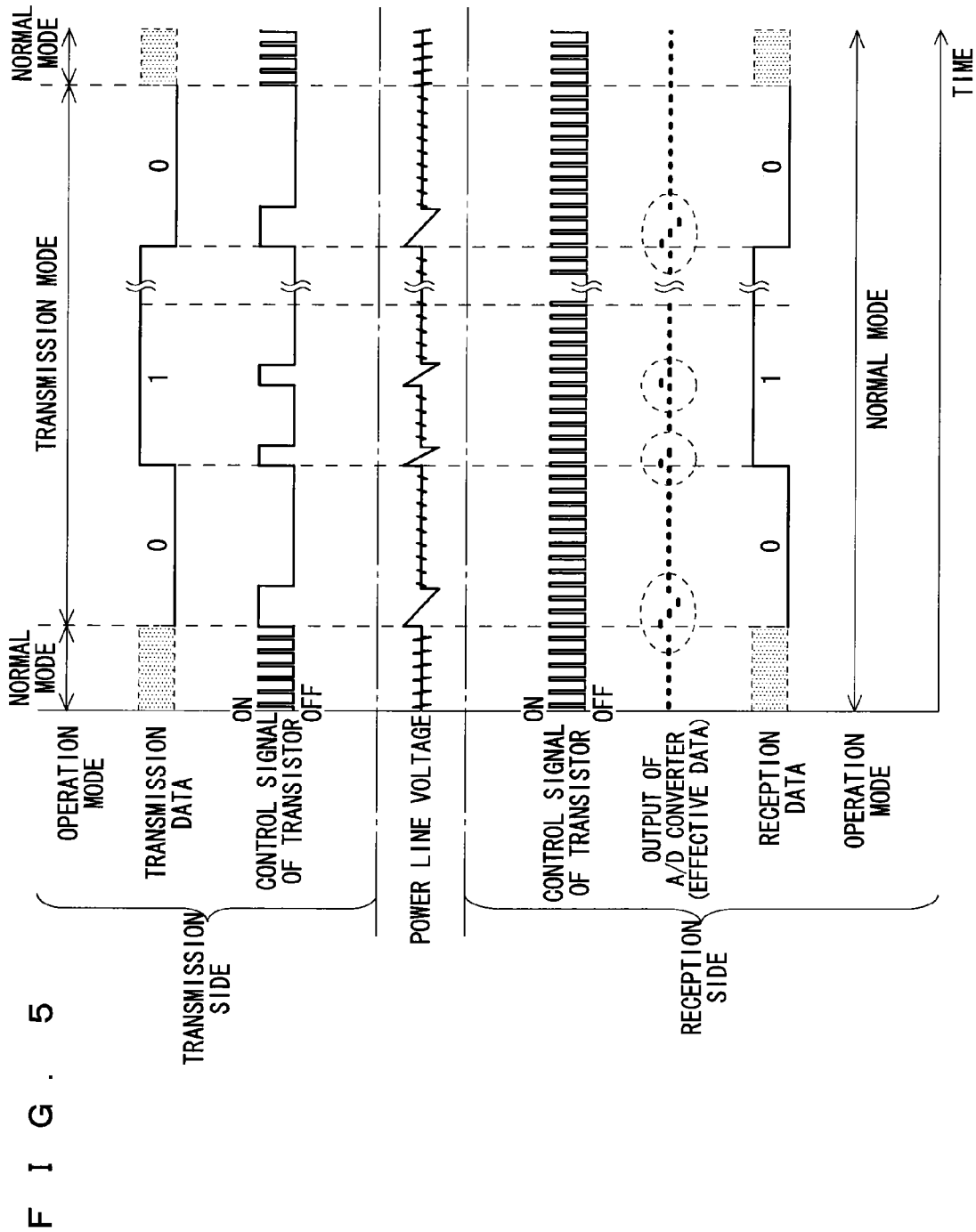
F I G. 5

PLC/POWER-SUPPLY HYBRID DEVICE AND DEVICE WITH COMMUNICATION FUNCTION

TECHNICAL FIELD

The present invention relates to a PLC/power-supply hybrid device having a power line communication (PLC) function and a power supply function, and to a device with communication function including such a PLC/power-supply hybrid device.

BACKGROUND ART

In a case of performing PLC in various devices such as a personal computer (PC), a PLC modem is provided and coupled to a wiring that connects the device and a power line to each other (see Patent Documents 1 to 3).

In general, each of the various devices includes a power supply circuit that converts a voltage supplied from the outside of the device into a desired voltage.

Particularly, Patent Document 3 proposes that the power supply circuit and the PLC modem share component parts to thereby reduce the costs of the component parts.

PRIOR-ART DOCUMENTS

Patent Documents

Patent Document 1: Japanese Patent Application Laid-Open No. 2007-5982
Patent Document 2: Japanese Patent Application Laid-Open No. 2008-227837
Patent Document 3: Japanese Patent Application Laid-Open No. 2006-94308

SUMMARY OF THE INVENTION

Problems to be Solved by the Invention

In various fields, a cost reduction and the like have been conventionally demanded, and this also applies to the field regarding the PLC. The proposal disclosed in Patent Document 3 is one measures therefor. However, an object of the present invention is to achieve sharing of a component part and reduce the costs, size, power consumption, and the like, through an approach different from the proposal disclosed in Patent Document 3.

Means for Solving the Problems

A PLC/power-supply hybrid device according to a first aspect of the present invention includes a power supply circuit that performs voltage conversion in which an input voltage applied to a voltage input terminal is converted into a voltage having a predetermined voltage value, and outputs the voltage obtained as a result of the voltage conversion to a voltage output terminal. The power supply circuit includes: a switching part for chopping a voltage of the voltage input terminal side; and a control circuit that controls the chopping by controlling switching of the switching part. The control circuit is operated in a normal mode and a transmission mode. The normal mode is a mode in which the voltage conversion is performed, and the transmission mode is a mode in which data transmission is performed through power line communication (PLC) using a power line that leads to the voltage input terminal. In the transmission mode, the control circuit modulates the switching in accordance with transmission data.

A PLC/power-supply hybrid device according to a second aspect is the PLC/power-supply hybrid device according to the first aspect described above, in which the control circuit performs the switching in the transmission mode, under a condition that allows the predetermined voltage value, which is generated in the normal mode, to be obtained while performing the modulation in accordance with the transmission data.

A PLC/power-supply hybrid device according to a third aspect is the PLC/power-supply hybrid device according to the first or second aspect described above, in which: the control circuit sets different switching cycles to the switching part between the normal mode and the transmission mode; and the control circuit sets an ON duration of the switching part such that the ON duration decreases as the switching cycle is shorter.

A PLC/power-supply hybrid device according to a fourth aspect is the PLC/power-supply hybrid device according to any one of the first to third aspects described above, further including: a voltage detector connected at the voltage output terminal side relative to a position where the switching part is connected, and configured to detect a voltage corresponding to the input voltage; and a PLC processing circuit that performs a reception data extraction process in which data transmitted from another device to the power line is extracted from a detected voltage detected by the voltage detector. The PLC processing circuit performs an input voltage estimation process in which the input voltage is estimated from the detected voltage based on information given in advance concerning a circuit configuration between the voltage input terminal and the voltage detector. The PLC processing circuit performs the reception data extraction process on an estimated voltage obtained as a result of the input voltage estimation process.

A PLC/power-supply hybrid device according to a fifth aspect is the PLC/power-supply hybrid device according to the fourth aspect described above, in which the control circuit performs a feed-back control on the switching based on the detected voltage detected by the voltage detector.

A PLC/power-supply hybrid device according to a sixth aspect is the PLC/power-supply hybrid device according to any one of the first to third aspects described above, further including: a voltage detector connected at the voltage output terminal side relative to a position where the switching part is connected, and configured to detect a voltage corresponding to the input voltage; and a PLC processing circuit that performs a reception data extraction process in which data transmitted from another device to the power line is extracted from a detected voltage detected by the voltage detector. The control circuit performs a feed-back control on the switching based on the detected voltage detected by the voltage detector.

A PLC/power-supply hybrid device according to a seventh aspect is the PLC/power-supply hybrid device according to the fifth or sixth aspect described above, in which: the control circuit performs an output voltage estimation process in which the voltage obtained as a result of the voltage conversion is estimated from the detected voltage based on information given in advance concerning a circuit configuration between the voltage detector and the voltage output terminal; and the control circuit performs a feed-back control on the switching based on an estimated voltage obtained as a result of the output voltage estimation process.

A PLC/power-supply hybrid device according to an eighth aspect is the PLC/power-supply hybrid device according to any one of the fourth to seventh aspects described above, in which: the power supply circuit is a power supply circuit of AC-input/isolated type including a transformer; and the voltage detector is connected so as to lead to a secondary side of the transformer.

A PLC/power-supply hybrid device according to a ninth aspect is the PLC/power-supply hybrid device according to any one of the fourth to eighth aspects described above, in which the PLC processing circuit performs the reception data extraction process on a portion of the detected voltage corresponding to an ON-period of the switching part.

A PLC/power-supply hybrid device according to a tenth aspect is the PLC/power-supply hybrid device according to any one of the first to third aspects described above, further including: a voltage detector connected at the voltage output terminal side relative to a position where the switching part is connected, and configured to detect a voltage corresponding to the input voltage; and a PLC processing circuit that performs a reception data extraction process in which data transmitted from another device to the power line is extracted from a detected voltage detected by the voltage detector. The PLC processing circuit performs the reception data extraction process on a portion of the detected voltage corresponding to an ON-period of the switching part.

A PLC/power-supply hybrid device according to an eleventh aspect is the PLC/power-supply hybrid device according to any one of the fourth to tenth aspects described above, further including a characteristic emphasis circuit that emphasizes a predetermined characteristic of a voltage that is to be inputted to the voltage detector. A characteristic emphasized by the characteristic emphasis circuit is different between an ON state and an OFF state of the switching part.

A PLC/power-supply hybrid device according to a twelfth aspect is the PLC/power-supply hybrid device according to any one of the first to eleventh aspects described above, in which the control circuit modulates the switching in the transmission mode, in accordance with a chirp signal.

A PLC/power-supply hybrid device according to a thirteenth aspect is the PLC/power-supply hybrid device according to any one of the first to twelfth aspects described above, in which a switching frequency in the normal mode is higher than a switching frequency in the transmission mode.

A device with communication function according to a fourteenth aspect includes: the PLC/power-supply hybrid device according to any one of the first to thirteenth aspects described above; and a main body circuit that performs said PLC through said PLC/power-supply hybrid device.

Effects of the Invention

In the first aspect described above, the PLC can be performed by using the switching part and the control circuit (hereinafter, also collectively referred to as "switching circuit") of the power supply circuit. That is, the switching circuit is shared between the power supply circuit and a circuit for the PLC (PLC circuit). Therefore, a switching circuit (so-called line driver) for the PLC circuit is not necessary. This can reduce the cost, size, power consumption, and the like, as compared with a configuration in which the power supply circuit and the PLC circuit separately have different switching circuits.

In the second aspect described above, the predetermined voltage value in the normal mode can be ensured even in the transmission mode. Accordingly, a stable voltage can be generated irrespective of an operation mode. This contributes to a high reliability.

The third aspect described above provides an example of a configuration that is able to generate a stable voltage irrespective of an operation mode The fourth aspect described above can ensure an accuracy of the reception data extraction process, that is, a reliability of data reception, even in a case where a circuit is interposed between the voltage detector and the voltage input terminal. In other words, the degree of freedom in a position where the voltage detector is connected is increased.

The fifth and sixth aspects described above allows the control circuit and the PLC processing circuit to share the voltage detector. Accordingly, the cost, size, power consumption, and the like, can be reduced as compared with a configuration in which the control circuit and the PLC circuit separately include different voltage detectors.

The seventh aspect described above can ensure an accuracy of the feed-back control on a transistor, that is, a reliability of the voltage conversion, even in a case where a circuit is interposed between the voltage detector and the voltage output terminal. In other words, the degree of freedom in a position where the voltage detector is connected is increased.

As for the eighth aspect described above, in a power supply circuit of AC-input/isolated type, in general, a coupling transformer used for PLC reception is provided at a primary side of a power supply circuit transformer. In the eighth aspect, on the other hand, the transformer serves as both the power supply circuit transformer and the coupling transformer used for PLC reception. This eliminates the need for a coupling transformer dedicated for PLC reception, which is generally provided. As a result, the cost, size, and the like, can be reduced as compared with a general configuration in which a power supply circuit and a PLC circuit separately include different transformers.

In the ninth and tenth aspects described above, data reception from the power line is more reliably achieved. This is because, when the switching part is in the OFF state, the voltage detector is not connected to the power line, and therefore, even if the reception data extraction process is performed by using a detected voltage that is detected in an OFF period, obtained data is invalid.

The eleventh aspect described above enables an efficient use of a dynamic range of the voltage detector.

In the twelfth aspect described above, a signal corresponding to the chirp signal is outputted to the power line. This allows communicate with excellent noise tolerance.

In the thirteenth aspect described above, a voltage variation in the power line is uniformized. This facilitates detection of the transmission data.

In the fourteenth aspect described above, the above-described various effects are exerted in the device with communication function.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 A waveform chart illustrating an operation of the PLC/power-supply hybrid device according to the second embodiment.

EMBODIMENT FOR CARRYING OUT THE INVENTION

First Embodiment

Utilization Form of PLC/Power-Supply Hybrid Device

Prior to a description of an exemplary configuration of a PLC/power-supply hybrid device (hereinafter, sometimes referred to as "hybrid device") having a power line communication (PLC) function and a power supply function, a utilization form thereof will be illustrated with reference to a block diagram of FIG. 1.

Figure 1:
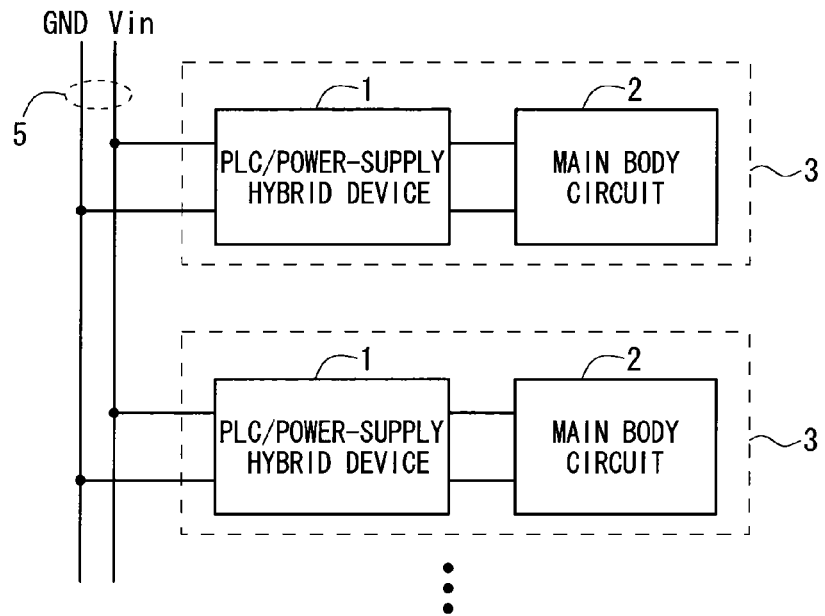
FIG. 1 A block diagram illustrating a utilization form of a PLC/power-supply hybrid device according to a first embodiment.

In an example shown in FIG. 1, when used, a hybrid device 1 is connected to a power line 5 and a main body circuit 2. In such a utilization form, the hybrid device 1 implements a power supply function and a communication function. The power supply function is a function for converting a voltage supplied from the power line 5 into a predetermined voltage value and then supplying the voltage obtained as a result of the conversion to the main body circuit 2. The communication function is a function used when the main body circuit 2 performs PLC using the power line 5. The main body circuit 2 corresponds to, for example, a personal computer (PC), various home appliances, and various batteries.

In the example shown in FIG. 1, a device 3 with communication function includes the hybrid device 1 and the main body circuit 2, and a plurality of the devices 3 with communication function are connected to the power line 5 to thereby configure a communication system. The device 3 with communication function exerts various effects of the hybrid device 1, which will be described later.

Here, the hybrid device 1 and the main body circuit 2 may be accommodated in the same housing, or may be accommodated in different housings.

The hybrid device 1 may be provided in combination with a specific main body circuit 2 (in other words, provided in the form of the device 3 with communication function), or may be provided alone (in other words, provided such that the hybrid device 1 can be subsequently combined with various types of main body circuits 2).

<Configuration of PLC/Power-Supply Hybrid Device>
<Configuration of Power Supply Function>

Figure 2:
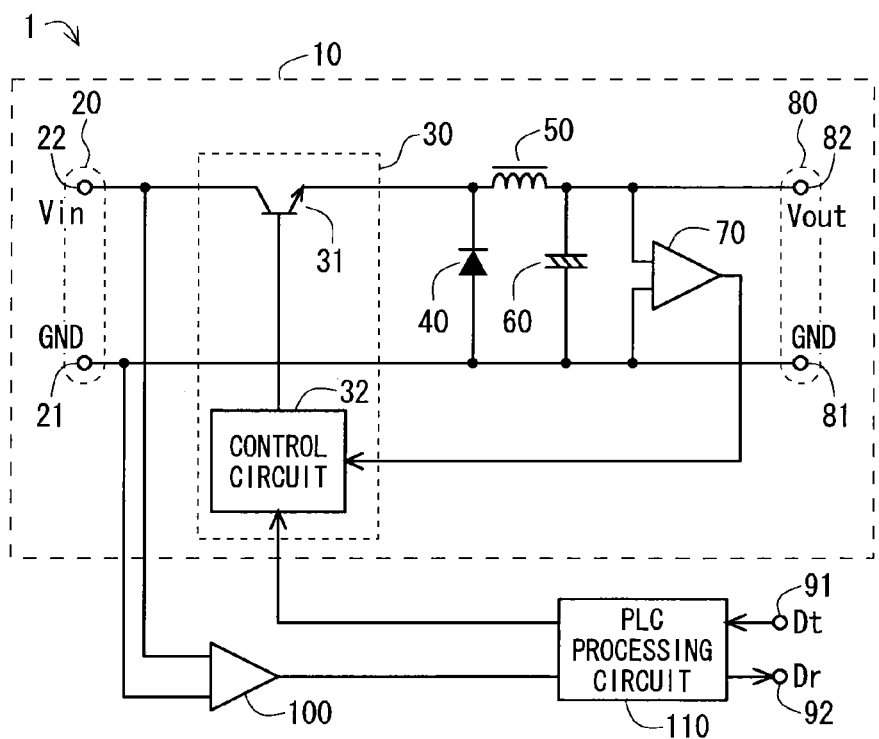
FIG. 2 A block diagram illustrating a configuration of the PLC/power-supply hybrid device according to the first embodiment.

FIG. 2 is a block diagram illustrating a configuration of the hybrid device 1. As shown in FIG. 2, the hybrid device 1 includes a power supply circuit 10 that implements the power supply function mentioned above. The power supply circuit 10 illustrated in FIG. 2 is a DC/DC converter, which is classified into a non-isolated type, a switching type, and a step-down type. In an example shown in FIG. 2, the power supply circuit 10 includes a voltage input terminal 20, a switching circuit 30, a diode 40, an inductor 50, a capacitor 60, a voltage detector 70, and a voltage output terminal 80.

The voltage input terminal 20 is a part to which a voltage, and in other words, power, is supplied from the power line 5 (see FIG. 1). According to the example shown in FIG. 1, the voltage input terminal 20 corresponds to an external connection terminal that is connected to the power line 5 provided outside the hybrid device 1. FIG. 2 illustrates a case where the voltage input terminal 20 includes input terminals 21 and 22, the terminal 21 is set at a ground potential GND, and a voltage Vin (here, a DC voltage) is applied across the terminals 21 and 22.

The input voltage Vin applied to the voltage input terminal 20 is subjected to voltage conversion performed by the power supply circuit 10, and thereby converted into a voltage Vout having a predetermined voltage value.

In the example shown in FIG. 2, the switching circuit 30 includes a switching part 31 and a control circuit 32.

The switching means part 31 is a part for chopping a voltage at the voltage input terminal 20 side (in an exemplary configuration shown in FIG. 2, the input voltage Vin applied to the voltage input terminal 20). In the example shown in FIG. 2, the switching part 31 is implemented by a bipolar transistor. Therefore, the switching part 31 will be also referred to as a bipolar transistor 31 or a transistor 31. The transistor 31 has a collector thereof connected to the input terminal 22, an emitter thereof connected to the diode 40 and the inductor 50, and a base thereof connected to the control circuit 32.

As the switching part 31, various switching elements such as a MOSFET or various circuits that can implement switching are adoptable. In a generalized sense, the switching part 31 includes one end (corresponding to the collector of the transistor 31), the other end (corresponding to the emitter of the transistor 31), and a control end (corresponding to the base of the transistor 31) to which a control signal is inputted. The control signal is for controlling a conducting/non-conducting state, and in other words, an ON/OFF state, between the one end and the other end. Based on the signal inputted to the control end, the conducting/non-conducting state between the one end and the other end is switched. Thereby, the voltage applied to the one end is chopped when appearing at the other end.

The control circuit 32 controls switching of the switching part 31. The control circuit 32 is connected to the base of the transistor 31, and controls the ON/OFF state of the transistor 31 by applying a pulse-shaped control signal to the base. Thereby, the switching part 31 chops the voltage Vin.

For simplification of the description, it is assumed that the transistor 31 is rendered conducting when the pulse-shaped control signal is at a High level (H level) and this conducting state is referred to as the ON state of the transistor 31. That is, it is assumed that there is a correspondence relationship among the H level of the pulse-shaped control signal, the conducting state of the transistor 31, and the ON state of the transistor 31. In this case, there is a correspondence relationship among a Low level (L level) of the pulse-shaped control signal, the non-conducting state of the transistor 31, and the OFF state of the transistor 31.

The control circuit 32 is configured to adjust, for example, the cycle and the duration of the H level of the control signal, thereby controlling a switching cycle (in other words, a switching frequency), an ON duration (that is, a time length during which the ON state continues), and the like, of the transistor 31. In this manner, a specific form of chopping performed by the transistor 31 is controlled.

The diode 40 has a cathode thereof connected to the emitter of the transistor 31, and an anode thereof connected to the input terminal 21. The diode 40 is a so-called free-wheeling diode. The inductor 50 has one end thereof connected to the cathode of the diode 40, and the other end thereof connected to one end of the capacitor 60. The other end of the capacitor 60 is connected to the anode of the diode 40. A voltage across the ends of the capacitor 60 is a desired voltage Vout obtained as a result of voltage conversion.

Here, the voltage detector 70 is used to detect the voltage Vout obtained as a result of the voltage conversion. For example, an A/D (Analog/Digital) converter is adoptable as the voltage detector 70. Therefore, the voltage detector 70 will be sometimes referred to as an A/D converter 70.

In the example shown in FIG. 2, the A/D converter 70 has one input end thereof connected to the one end of the capacitor 60, the other input end thereof connected to the other end of the capacitor 60, and an output end thereof connected to the control circuit 32. Thereby, the voltage Vout across the ends of the capacitor 60 (that is, the voltage obtained as a result of voltage conversion) is detected, and this detected voltage value is subjected to A/D conversion and then supplied to the control circuit 32.

The voltage output terminal 80 is a part for extracting the converted voltage Vout generated from the input voltage Vin. FIG. 2 illustrates a case where the voltage output terminal 80 includes output terminals 81 and 82, the terminal 81 is connected to the other input end of the A/D converter 70, and the terminal 82 is connected to the one input end of the A/D converter 70. In this case, the terminal 81 is set at the ground potential GND, and the voltage Vout is obtained across the terminals 81 and 82. In the example shown in FIG. 1, the voltage output end 80 corresponds to an external connection terminal that is connected to the main body circuit 2 provided outside the hybrid device 1.

<Configuration of PLC Function>

As shown in FIG. 2, the hybrid device 1 further includes a data input terminal 91, a data output terminal 92, a voltage detector 100, and a PLC processing circuit 110, which are associated with the PLC function. To implement the PLC function of the hybrid device 1, the switching circuit 30 described above is additionally used, as will become apparent from the description given later. That is, the power supply function and the PLC function share the switching circuit 30.

The data input terminal 91 is a part to which data Dt to be transmitted to the power line 5 (see FIG. 1) is inputted. According to the example shown in FIG. 1, the data input terminal 91 corresponds to the external connection terminal that is connected to the main body circuit 2. The transmission data Dt is supplied from the main body circuit 2 to the data input terminal 91.

The data output terminal 92 is a part for extracting data Dr received from the power line 5 (see FIG. 1). According to the example shown in FIG. 1, the data output terminal 92 corresponds to the external connection terminal that is connected to the main body circuit 2. The reception data Dr is supplied to the main body circuit 2 via the data output terminal 92.

Although FIG. 2 illustrates a case where the data input terminal 91 is configured as one terminal, the data input terminal 91 may be configured with a plurality of terminals. The same applies to the data output terminal 92.

Here, the voltage detector 100 is used to detect the input voltage Vin applied to the voltage input terminal 20. For example, an A/D converter is adoptable as the voltage detector 100. Therefore, the voltage detector 100 will be sometimes referred to as an A/D converter 100.

In the example shown in FIG. 2, the A/D converter 100 has one input end thereof connected to the input terminal 22, the other input end thereof connected to the input terminal 21, and an output end thereof connected to the PLC processing circuit 110. Thereby, a voltage value of an input voltage Vin (before chopped by the transistor 31) is detected, and this detected voltage value is subjected to A/D conversion and then inputted to the PLC processing circuit 110.

The PLC processing circuit 110 is connected to the data input terminal 91, the data output terminal 92, the control circuit 32, and the output end of the A/D converter 100.

The PLC processing circuit 110 performs various processes concerning the PLC (broadly divided into a transmission process and a reception process).

In the transmission process, for example, the PLC processing circuit 110 performs a predetermined transmission baseband process on the transmission data Dt inputted to the data input terminal 91, and thereby generates a baseband signal.

Examples of the transmission baseband process include a process for adding information (such as error control information) concerning a control and a process for dividing data into a predetermined size. Contents of the transmission process are defined in accordance with a protocol adopted for the hybrid device 1.

The PLC processing circuit 110 outputs the generated baseband signal to the control circuit 32. The control circuit 32 controls the transistor 31 in accordance with the baseband signal (therefore, in accordance with the transmission data Dt). As a result, the transmission data Dt is transmitted to the power line 5 (see FIG. 1) (which will be described later).

Indeed, it is possible to use the transmission data Dt as the baseband signal without any change made thereto by the PLC processing circuit 110, but performing various types of data processing by the PLC processing circuit 110 can improve the reliability of communication.

In the reception process, on the other hand, the PLC processing circuit 110 performs a predetermined reception baseband process on an output signal of the A/D converter 100 (that is, a detected voltage of the input voltage Vin), and thereby extracts data transmitted from other devices to the power line 5 (see FIG. 1) (reception data extraction process).

Examples of the reception baseband process include a process for extracting a baseband signal from an output signal of the A/D converter 100, a process in accordance with information (such as error control information) concerning a control which is added to the baseband signal, a process for restoring data having been transmitted in a divided form, and a process for determining whether or not received data is data addressed to the hybrid device 1. Contents of the reception process are defined in accordance with a protocol adopted for the hybrid device 1.

<Operation of PLC/Power-Supply Hybrid Device>

Figure 3:
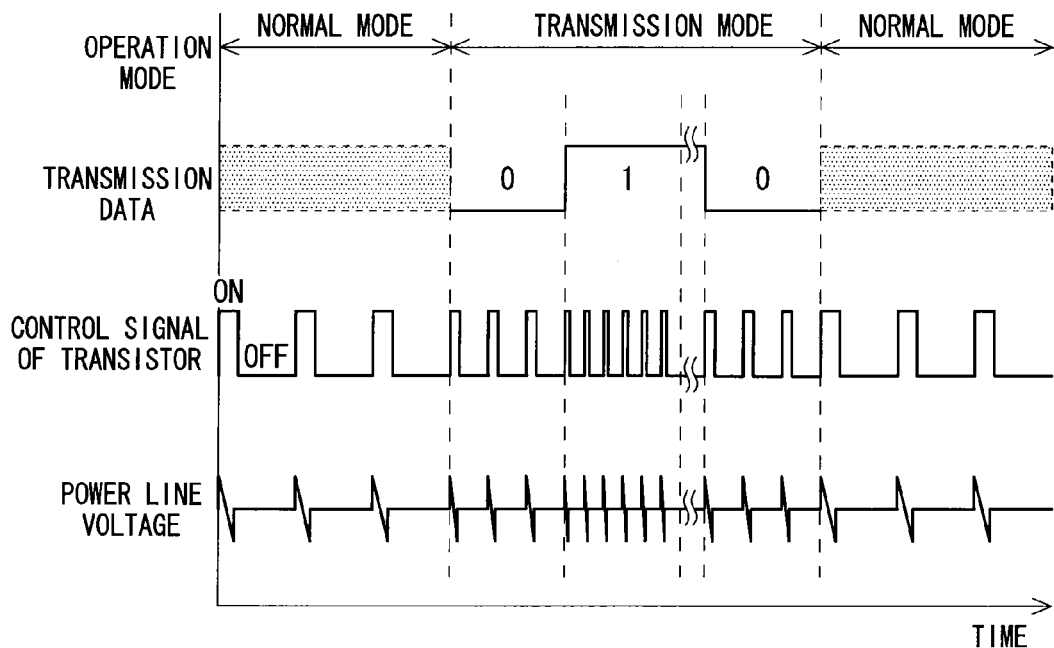
FIG. 3 A waveform chart illustrating an operation of the PLC/power-supply hybrid device according to the first embodiment.

FIG. 3 is a waveform chart illustrating an operation of the hybrid device 1. As shown in FIG. 3, the operation of the hybrid device 1 is broadly divided into a normal mode and a transmission mode.

<Normal Mode>

In the normal mode, the hybrid device 1 is operated generally as follows. That is, the input voltage Vin is chopped by the transistor 31 and smoothed by an LC filter including the inductor 50 and the capacitor 60, resulting in the output voltage Vout. As seen from this, the output voltage Vout is a voltage originating from the input voltage Vin and corresponding to the input voltage Vin.

A voltage value of the output voltage Vout can be controlled based on setting of the chopping performed on the input voltage Vin, and in other words, based on the cycle, the pulse width, and the like, of the control signal given to the transistor 31.

Accordingly, in the normal mode, the control circuit 32 controls a pulse shape of the control signal given to the transistor 31 such that a difference between a detected value of the output voltage Vout obtained by the A/D converter 70 and a set value of the output voltage Vout which has been set in advance (feed-back control). In a case illustrated herein, in the normal mode, a so-called pulse width modulation (Pulse Width Modulation; PWM) is adopted in which a pulse cycle is constant and an ON duration of the pulse (in other words, a duty cycle (=ON-duration/pulse-cycle) of the pulse) is controlled.

Thus, in the normal mode, the control circuit 32 controls the chopping that the transistor 31 performs on the input voltage Vin, and performs voltage conversion to obtain a desired voltage value.

For the feed-back control mentioned above, a comparator may be used as the voltage detector 70. To be specific, it may be possible that the comparator detects the voltage Vout obtained as a result of conversion, compares this detected voltage value with the set value of the voltage Vout, and transmits to the control circuit 32 a signal concerning a result of the comparison. That is, comparison between the detected value and the set value of the output voltage Vout may be performed by the comparator instead of the control circuit 32.

<Transmission Mode>

In the transmission mode, the hybrid device 1 is operated generally as follows, to perform data transmission through the PLC using the power line 5 that leads to the voltage input terminal 20. That is, such a phenomenon that noise is generated in the voltage Vin of the power line 5 in response to the switching of the transistor 31 is used (see FIG. 3). More specifically, the control circuit 32 modulates the switching of the transistor 31 in accordance with the above-described transmission baseband signal that is supplied from the PLC processing circuit 110, and thereby causes intended noise in accordance with the transmission baseband signal (thus, in accordance with the transmission data Dt) to occur on the power line 5. Such intended noise enables the transmission data Dt to be delivered onto the power line 5.

In a case illustrated herein, in performing switching modulation, a switching cycle different from that of the normal mode is used, and different switching cycles are used for data "0" and data "1". For example, as shown in FIG. 3, a switching cycle corresponding to the data "0" is set shorter than a switching cycle in the normal mode, and a switching cycle corresponding to the data "1" is set shorter than the switching cycle corresponding to the data "0". Since noise is generated on the power line 5 in synchronization with the switching cycle, the data "0" and "1" can be delivered onto the power line 5. Thus, the transmission baseband signal can be delivered onto the power line 5.

<Reception Operation>

A reception operation of the hybrid device 1 is performed in the normal mode. Therefore, the normal mode may be also referred to as a reception mode, a reception waiting mode, and the like.

The hybrid device 1 is operated generally as follows, to perform data reception through the PLC using the power line 5 that leads to the voltage input terminal 20. That is, the PLC processing circuit 110 performs the above-described reception data extraction process on the voltage Vin that the A/D converter 100 has detected in the normal mode. Thereby, the transmission data delivered onto the power line 5 by another hybrid device 1 is received through the power line 5.

Particularly, the reception data extraction process (in other words, the reception baseband process) includes a process corresponding to the transmission operation described above. That is, the process for extracting the baseband signal from the output signal of the A/D converter 100 includes a process for picking up noise cycles corresponding to the data "0" and "1" from the detected voltage detected by the A/D converter 100.

<Effects, Etc.>

In the hybrid device 1, the PLC can be performed by using the switching circuit 30 of the power supply circuit 10. That is, the power supply circuit 10 and a circuit for PLC (PLC circuit) share the switching circuit 30. Therefore, a switching circuit (so-called line driver) for the PLC circuit is not necessary. This can reduce the cost, size, power consumption, and the like, as compared with a configuration in which the power supply circuit 10 and the PLC circuit separately have different switching circuits.

As described above, in the transmission mode, the transistor 31 is switched in order to cause noise in accordance with the transmission data to occur on the power line 5. However, even in this switching, the input voltage Vin is chopped and sent to a subsequent stage. Accordingly, although it is possible to switch the transistor 31 only for the purpose of data transmission, an appropriate control of the switching in the transmission mode enables the predetermined voltage value of the output voltage Vout, which is obtained in the normal mode, to be also obtained in the transmission mode, too.

More specifically, the control circuit 32 switches the transistor 31 in the transmission mode, under conditions that allow a predetermined voltage value that is generated in the normal mode to be obtained while modulation in accordance with the transmission data is performed. Thereby, a stable voltage Vout can be generated irrespective of an operation mode. This contributes to a high reliability.

More specifically, the above-mentioned conditions can be satisfied by setting the ON duration of the transistor 31 such that the ON duration decreases as the switching cycle is shorter.

The switching cycle may be set in the manner opposite to an example shown in FIG. 3, that is, the switching cycle corresponding to data "0" may be set shorter than the switching cycle corresponding to the data "1"

Also, the switching cycle in the normal mode may be set shorter than the switching cycle in the transmission mode (that is, the switching cycles corresponding to data "0" and "1"). As the switching cycle is shorter (that is, as the switching frequency is higher), an interval of occurrence of noise decreases, which may sometimes uniformize a voltage variation (in other words, noise) in the power line 5. In this case, noise corresponding to the transmission data is superimposed on the uniformized voltage. This facilitates detection of the transmission data.

Second Embodiment

Figure 4:
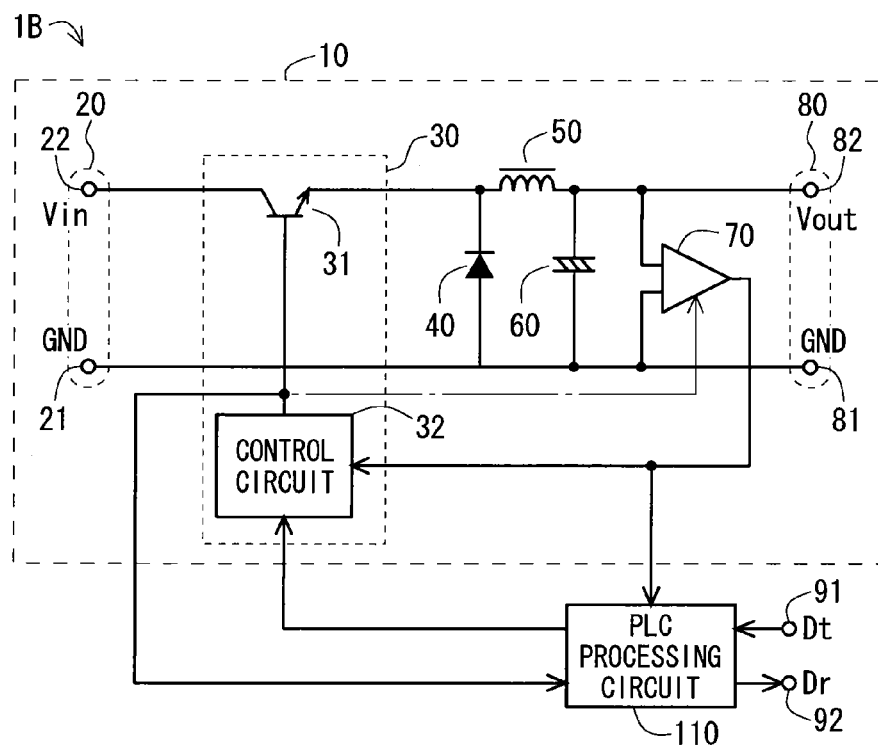
FIG. 4 A block diagram illustrating a configuration of a PLC/power-supply hybrid device according to a second embodiment.

FIG. 4 is a block diagram illustrating a configuration of a PLC/power-supply hybrid device 1B according to a second embodiment. The hybrid device 1B can also be provided in combination with the main body circuit 2 (see FIG. 1).

The hybrid device 1B has a configuration similar to that of the hybrid device 1 described above (see FIG. 2), except for the following points. In the hybrid device 1B, the A/D converter 100 of the hybrid device 1 described above is omitted, and the output of the A/D converter 70 is supplied not only to the control circuit 32 but also to the PLC processing circuit 110. Additionally, in the hybrid device 1B, the control signal outputted from the control circuit 32 is supplied not only to the transistor 31 but also to the PLC processing circuit 110. The other parts of the configuration of the hybrid device 1B are basically the same as those of the hybrid device 1 described above.

In this configuration, a detected voltage detected by the A/D converter 70 is used by the control circuit 32 for the feed-back control on the transistor 31, and also used by the PLC processing circuit 110 for the reception data extraction process.

Since the control circuit 32 and the PLC processing circuit 110 share the A/D converter 70, the cost, size, power consumption, and the like, can be reduced as compared with the hybrid device 1 described above (see FIG. 2) in which the control circuit 32 and the PLC circuit separately include the different voltage detectors 70 and 100.

In the reception operation, the PLC processing circuit 110 performs the reception data extraction process on, in the detected voltage detected by the A/D converter 70, a portion corresponding to the ON-period of the transistor 31.

This is because the A/D converter 70 is connected to the voltage output terminal 80 side relative to a position where the transistor 31 is connected, and therefore when the transistor 31 is in the OFF state, the A/D converter 70 is not connected to the power line 5. That is, even if the reception data extraction process is performed by using a voltage that is detected in an OFF period of the transistor 31, obtained data is invalid. Therefore, as described above, the reception data extraction process is performed on a voltage that is detected in the ON-period of the transistor 31. Thereby, data reception from the power line 5 is more reliably achieved.

In view of this point, the PLC processing circuit 110 obtains the control signal of the transistor 31 from the processing circuit 32 and, in synchronization with this control signal, selects a portion corresponding to the ON-period of the transistor 31 among the detected voltage detected by the A/D converter 70 (that is, an effective portion of the output of the A/D converter 70).

Alternatively, a configuration may be adoptable in which an output operation of the A/D converter 70 or the entire operation of the A/D converter 70 is synchronized with the control signal of the transistor 31 (see the dot-and-dash arrow in FIG. 4).

FIG. 5 is a waveform chart illustrating an operation of the hybrid device 1B. In a case illustrated in FIG. 5, the switching frequency (in other words, the switching cycle) in the normal mode is higher than the switching frequency in the transmission mode.

As shown in FIG. 5, in the reception-side hybrid device 1B, an effective portion of the detected voltage detected by the A/D converter 70 is discretely obtained in synchronization with the ON-period of the transistor 31. Even such discrete information enables detection of the presence and the cycle of noise corresponding to the data transmitted to the power line 5 (see portions enclosed by the broken line circles in FIG. 5).

The A/D converter 70 is connected to the voltage output terminal 80 side relative to the position where the transistor 31 is connected and, unlike the A/D converter 100 (see FIG. 2), connected to a position on the circuit which is distant from the voltage input terminal 20. Therefore, when the detected voltage detected by the A/D converter 70 is used, it may be difficult to perform the reception data extraction process with the same accuracy as in the hybrid device 1 described above (see FIG. 2).

In such a case, it may be possible that the PLC processing circuit 110 estimates the input voltage Vin based on the detected voltage (originating from the input voltage Vin and corresponding to the input voltage Vin) detected by the A/D converter 70, and the reception data extraction process is performed on this estimated voltage. The estimation of the input voltage Vin can be performed based on information of a circuit configuration between the voltage input terminal 20 and the A/D converter 70. The information of the circuit configuration can be given to the PLC processing circuit 110, by mathematizing the circuit configuration or by obtaining a correspondence relationship between input and output values of the circuit configuration and making a database thereof. A mathematical expression, a database, and the like, of the information of the circuit configuration may be provided as hardware (such as a digital filter) or may be provided as software (in other words, a program process).

Use of an input voltage estimation process can ensure an accuracy of the reception data extraction process, that is, a reliability of data reception, even in a case where a circuit is interposed between the voltage input terminal 20 and the A/D converter 70. In other words, the degree of freedom in a position where the A/D converter used for the data reception is connected is increased.

In the hybrid device 1B, the same configuration or operation as that of the hybrid device 1 described above exerts the same effects as those of the hybrid device 1 described above.

Third Embodiment

Figure 6:
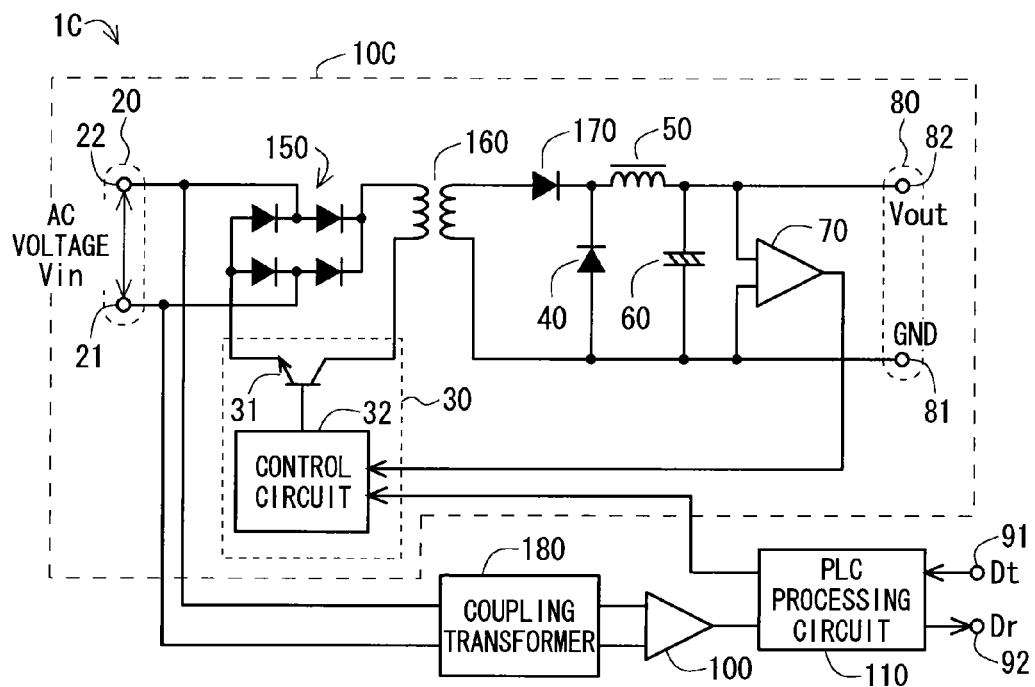
FIG. 6 A block diagram illustrating a configuration of a PLC/power-supply hybrid device according to a third embodiment.

FIG. 6 is a block diagram illustrating a configuration of a PLC/power-supply hybrid device 1C according to a third embodiment. The hybrid device 1C can also be provided in combination with the main body circuit 2 (see FIG. 1).

As shown in FIG. 6, the hybrid device 1C includes a power supply circuit 10C. The power supply circuit 10C illustrated in FIG. 6 is an AC/DC converter, which is classified into an isolated type, a switching type, and a step-down type. In an example shown in FIG. 6, the power supply circuit 10C has a configuration in which a rectifier circuit 150, a transformer 160, and a diode 170 are additionally provided to the power supply circuit 10 described above (see FIG. 2). Since the power supply circuit 10C is an AC/DC converter as mentioned above, an AC voltage Vin is applied to the voltage input terminal 20 while a DC voltage Vout is provided to the voltage output terminal 80.

In the example shown in FIG. 6, the rectifier circuit 150 is a full-wave rectifier circuit of bridge type. However, a configuration of the rectifier circuit 150 is not limited to this example. In the example shown in FIG. 6, the rectifier circuit 150 has one input end thereof connected to the voltage input terminal 21, the other input end thereof connected to the voltage input terminal 22, one output end thereof connected to one end of a primary winding of the transformer 160, and the other output end thereof connected to the emitter of the transistor 31.

In the transformer 160, the one end of the primary winding is connected to the one output end of the rectifier circuit 150 as described above, and the other end of the primary winding is connected to the collector of the transistor 31. In the transformer 160, one end of a secondary winding is connected to an anode of the diode 170, and the other end of the secondary winding is connected to the anode of the diode 40.

The diode 170 has the anode thereof connected to the one end of the secondary winding of the transformer 160 as described above, and a cathode thereof connected to the cathode of the diode 40.

A configuration from the diode 40 to the voltage output terminal 80 is the same as those of the power supply circuit 10 described above (see FIG. 2).

In the hybrid device 1C as well, the transistor 31 chops a voltage of the voltage input terminal 20 side, but the chopping is performed on a voltage obtained after being applied to the voltage input terminal 20 and passing through the rectifier circuit 150.

The hybrid device 1C illustrated in FIG. 6 includes the A/D converter 100 and the PLC processing circuit 110 similarly to the hybrid device 1 (see FIG. 2), and further includes a coupling transformer 180.

The coupling transformer 180 is connected to the voltage input terminal 20 and to the input end of the A/D converter 100, and acts as a so-called insulating transformer.

Thus, the hybrid device 1C is an example of an application of the configuration of the hybrid device 1 described above (see FIG. 2) to an AC/DC converter (that is, the power supply circuit 10C). The control circuit 32, the PLC processing circuit 110, and the like, of the hybrid device 1C are operated in the same manner as those of the hybrid device 1 described above, and thereby the same effects as those of the hybrid device 1 described above are obtained.

Fourth Embodiment

Figure 7:
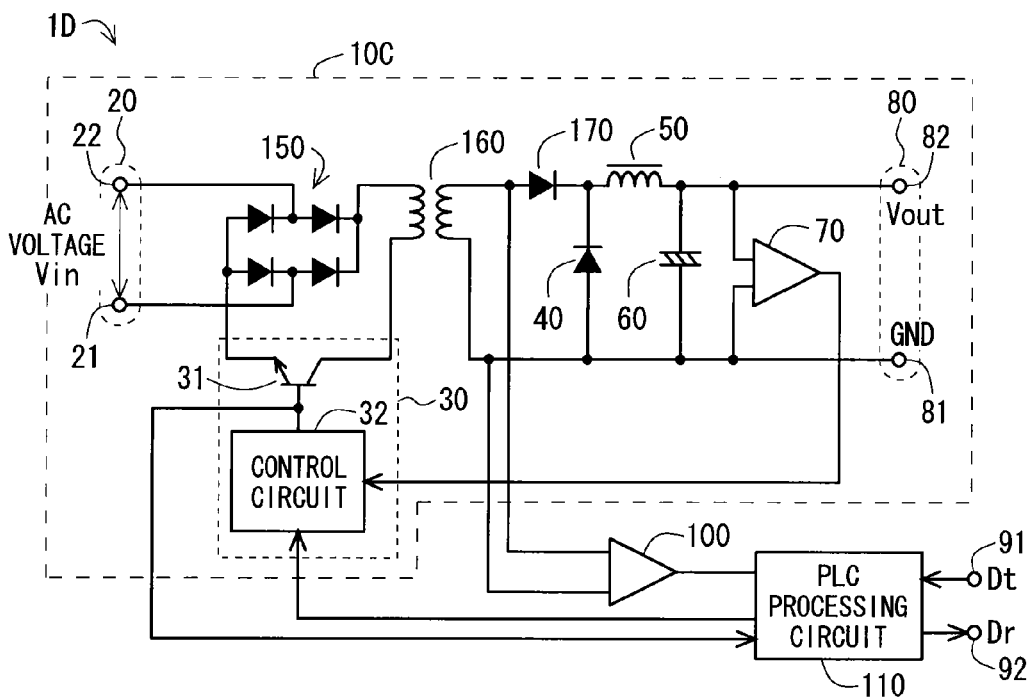
FIG. 7 A block diagram illustrating a configuration of a PLC/power-supply hybrid device according to a fourth embodiment.

FIG. 7 is a block diagram illustrating a configuration of a PLC/power-supply hybrid device 1D according to a fourth embodiment. The hybrid device 1D can also be provided in combination with the main body circuit 2 (FIG. 1).

The hybrid device 1D has a configuration similar to that of the hybrid device 1C described above (see FIG. 6), except for the following points. In the hybrid device 1D, the coupling transformer 180 of the hybrid device 1C described above is not provided.

In the hybrid device 1D, additionally, the A/D converter 100 is provided so as to lead to the secondary side of the transformer 160. More specifically, in the hybrid device 1D, one input end of the A/D converter 100 is connected to the one end of the secondary winding of the transformer 160, and the other input end of the A/D converter 100 is connected to the other end of the secondary winding of the transformer 160.

In the hybrid device 1D, similarly to the hybrid device 1B described above (see FIG. 4), the control signal outputted from the control circuit 32 is supplied not only to the transistor 31 but also to the PLC processing circuit 110.

The other parts of the configuration of the hybrid device 1D are basically the same as those of the hybrid device 1C described above.

In the hybrid device 1C described above (see FIG. 6), in the power supply circuit 10C of AC-input/isolated type, the coupling transformer 180 (see FIG. 6) used for PLC reception is provided at the primary side of the power supply circuit transformer 160. In the hybrid device 1D, on the other hand, the A/D converter 100 is provided so as to lead to the secondary side of the power supply circuit transformer 160, and thereby the power supply circuit transformer 160 serves also as the coupling transformer 180 used for PLC reception. This eliminates the need for the coupling transformer 180 dedicated for PLC reception. As a result, the cost, size, and the like, can be reduced as compared with the hybrid device 1C described above.

Meanwhile, the A/D converter 100 is connected at the voltage output terminal 80 side relative to the position where the transistor 31 is connected. This configuration is the same as that of the hybrid device 1B described above (see FIG. 4).

Accordingly, it may be possible that the PLC processing circuit 110 estimates the input voltage Vin based on the detected voltage detected by the A/D converter 100 (input voltage estimate process), and the reception data extraction process is performed on this estimated voltage.

As for the reception operation, it is preferable that the PLC processing circuit 110 performs the reception data extraction process on, in the detected voltage detected by the A/D converter 100, a portion corresponding to the ON-period of the transistor 31.

In the hybrid device 1D, the same configuration or operation as that of the hybrid devices 1, 1B, and 1C described above exerts the same effects as those of the hybrid devices 1, 1B, and 1C described above.

Fifth Embodiment

Figure 8:
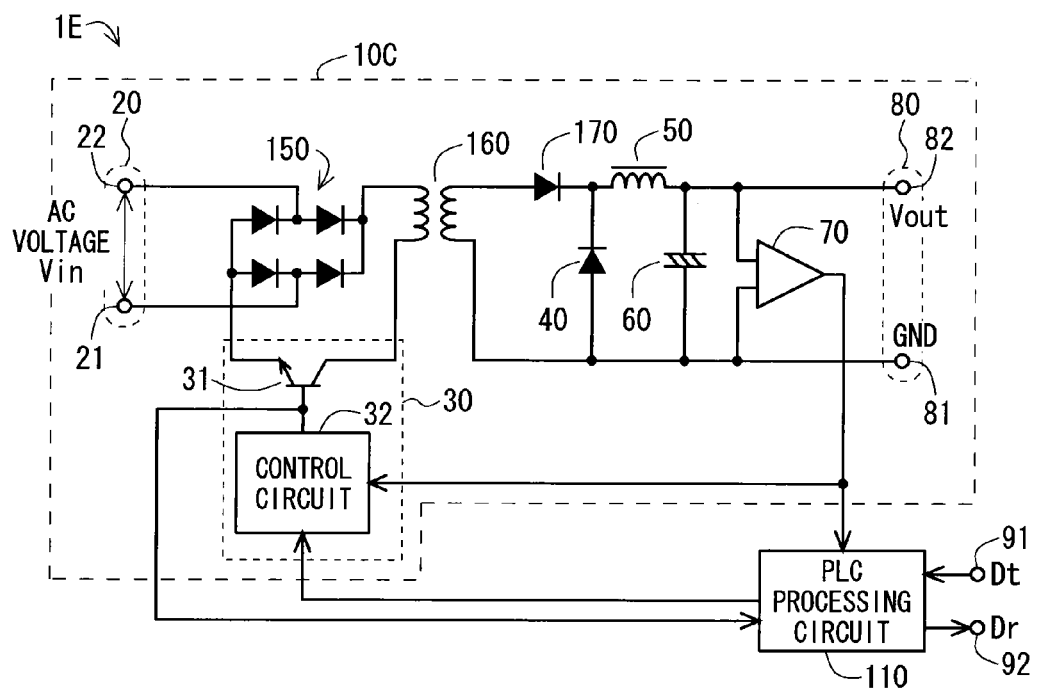
FIG. 8 A block diagram illustrating a configuration of a PLC/power-supply hybrid device according to a fifth embodiment.

FIG. 8 is a block diagram illustrating a configuration of a PLC/power-supply hybrid device 1E according to a fifth embodiment. The hybrid device 1E can also be provided in combination with the main body circuit 2 (see FIG. 1).

The hybrid device 1E has a configuration similar to that of the hybrid device 1D described above (see FIG. 7), except for the following points. In the hybrid device 1E, the A/D converter 100 of the hybrid device 1D described above is not provided, and the output of the A/D converter 70 is supplied not only to the control circuit 32 but also to the PLC processing circuit 110. The other parts of the configuration of the hybrid device 1E are basically the same as those of the hybrid device 1D described above.

In the hybrid device 1E, similarly to the hybrid device 1B described above (see FIG. 4), the control circuit 32 and the PLC processing circuit 110 share the A/D converter 70. Accordingly, the same effects as those of the hybrid device 1B described above are obtained.

In the hybrid device 1E, the same configuration or operation as that of the hybrid devices 1 and 1B-1D described above exerts the same effects as those of the hybrid device 1 and 1B-1D described above.

Sixth Embodiment

Figure 9:
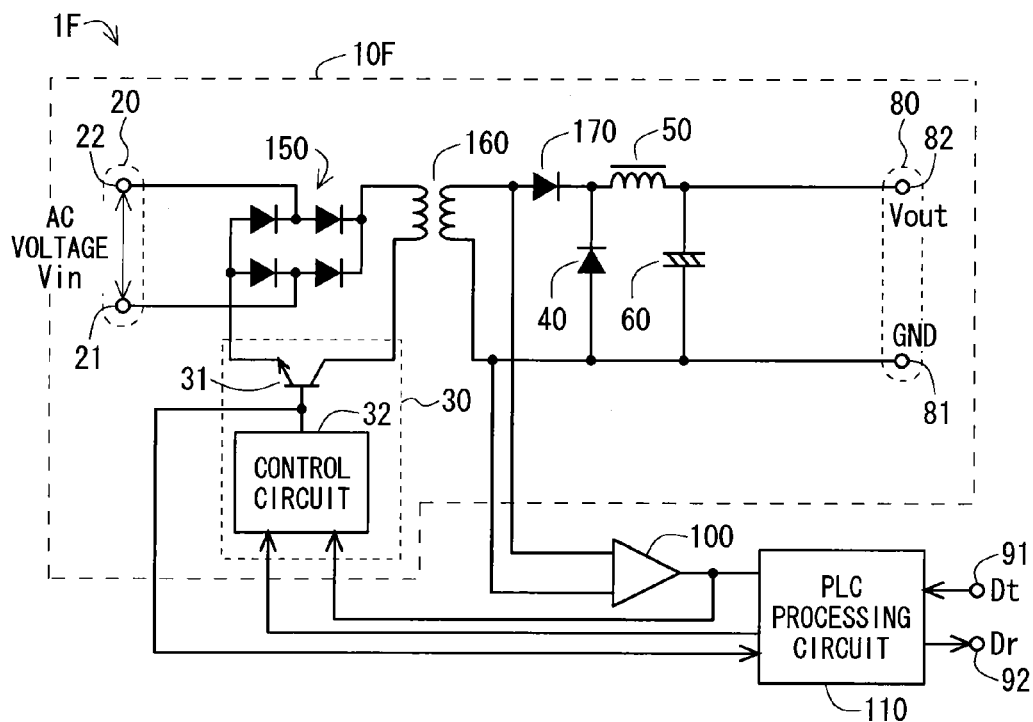
FIG. 9 A block diagram illustrating a configuration of a PLC/power-supply hybrid device according to a sixth embodiment.

FIG. 9 is a block diagram illustrating a configuration of a PLC/power-supply hybrid device 1F according to a sixth embodiment. The hybrid device 1F can also be provided in combination with the main body circuit 2 (see FIG. 1).

The hybrid device 1F has a configuration similar to that of the hybrid device 1D described above (see FIG. 7), except for the following points. The hybrid device 1F includes a power supply circuit 10F instead of the power supply circuit 10C described above (see FIG. 7). In the power supply circuit 10F, the A/D converter 70 of the power supply circuit 10C described above is not provided. In the hybrid device 1F, the output of the A/D converter 100 is supplied not only to the PLC processing circuit 110 but also to the control circuit 32. The other parts of the configuration of the hybrid device 1F are basically the same as those of the hybrid device 1D described above.

The hybrid device 1F is the same as the hybrid device 1E described above (see FIG. 8) in terms of the sharing of the A/D converter, but different from the hybrid device 1E described above in that a shared A/D converter is the A/D converter 100. That is, in the hybrid device 1F, the control circuit 32 and the PLC processing circuit 110 share the A/D converter 100. In a case of sharing the A/D converter 100, similarly to the hybrid device 1E described above, the effect of reduction in the cost, size, power consumption, and the like, is obtained.

The A/D converter 100 is similar to the A/D converter 70 (see FIG. 8) in that it is connected at the voltage output terminal 80 side relative to the position where the transistor 31 is connected, but different from the A/D converter 70 in that it is connected at a position on the circuit which is distant from the voltage output terminal 80. Therefore, when the feed-back control is performed on the transistor 31 by using the detected voltage detected by the A/D converter 100, the same accuracy as in the hybrid device 1E described above (see FIG. 8) may sometimes not be obtained.

In such a case, it may be possible that the control circuit 32 estimates the output voltage Vout based on the detected voltage (originating from the input voltage Vin and corresponding to the input voltage Vin) detected by the A/D converter 100, and the feed-back control is performed on the transistor 31 based on this estimated voltage. The estimation of the output voltage Vout can be performed based on information of a circuit configuration between the A/D converter 100 and the voltage output terminal 80. The information of the circuit configuration can be given to the PLC processing circuit by, for example, the same method as adopted in the estimation process for estimating the input voltage Vin in the hybrid device 1B described above (see FIG. 5).

Use of an output voltage estimation process can ensure an accuracy of the feed-back control on the transistor 31, that is, a reliability of voltage conversion, even in a case where a circuit is interposed between the A/D converter 100 and the voltage output terminal 80. In other words, the degree of freedom in a position where the A/D converter used for the feed-back control on the transistor 31 is connected is increased.

In the hybrid device 1F, the same configuration or operation as that of the hybrid devices 1 and 1B-1E described above exerts the same effects as those of the hybrid devices 1 and 1B-1E described above.

Seventh Embodiment

Figure 10:
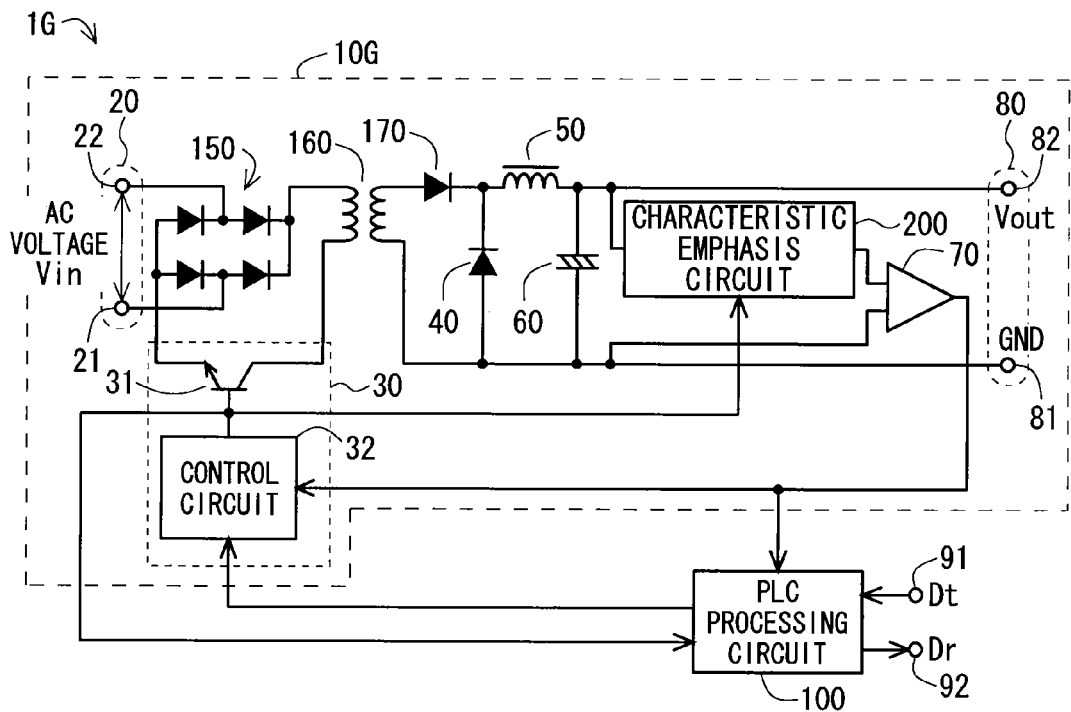
FIG. 10 A block diagram illustrating a configuration of a PLC/power-supply hybrid device according to a seventh embodiment.

FIG. 10 is a block diagram illustrating a configuration of a PLC/power-supply hybrid device 1G according to a seventh embodiment. The hybrid device 1G can also be provided in combination with the main body circuit 2 (see FIG. 1).

The hybrid device 1G includes, instead of the power supply circuit 10C described above (see FIG. 8), a power supply circuit 10G having a configuration in which a characteristic emphasis circuit 200 is additionally provided to the power supply circuit 10C described above. The other parts of the configuration of the hybrid device 1G are basically the same as those of the hybrid device 1E described above.

The characteristic emphasis circuit 200 emphasizes a predetermined characteristic of a voltage inputted thereto, and outputs an emphasized voltage. In an example shown in FIG. 10, the characteristic emphasis circuit 200 is provided in an input stage of the A/D converter 70, to emphasize the predetermined characteristic of a voltage (here, the output voltage Vout) that is to be inputted to the A/D converter 70.

As the characteristic emphasized by the characteristic emphasis circuit 200, herein, a frequency and a voltage value are taken as an example. More specifically, the characteristic emphasis circuit 200 has a function as a band-pass filter (BPF) and a function as an amplifier (AMP). Therefore, in a voltage to be inputted to the A/D converter 70, a specific frequency band is extracted and a voltage value is increased.

Moreover, the control signal of the transistor 31, which is supplied from the control circuit 32, is inputted to the characteristic emphasis circuit 200. The characteristic emphasis circuit 200 is configured to change which characteristic is to be emphasized in accordance with the ON state and the OFF state of the transistor 31.

More specifically, when the transistor 31 is in the ON state, the performance of the BPF and AMP are set such that an output of the A/D converter 70 is suited for a process performed in the PLC processing circuit 110, that is, such that a signal whose frequency and voltage value are suitable for the reception data extraction process is supplied to the PLC processing circuit 110.

On the other hand, when the transistor 31 is in the OFF state, the performance of the BPF and AMP are set such that an output of the A/D converter 70 is suited for a process performed in the control circuit 32, that is, such that a signal whose frequency and voltage value are suitable for the process of comparison with the set value of the output voltage Vout is supplied to the control circuit 32.

Adoption of the characteristic emphasis circuit 200 enables an efficient use of a dynamic range of the A/D converter 70.

In the example illustrated herein, the characteristic emphasis circuit 200 is applied to the hybrid device 1E described above. However, the characteristic emphasis circuit 200 is also applicable to the hybrid devices 1B and 1F described above.

In the hybrid device 1G, the same configuration or operation as that of the hybrid devices 1 and 1B-1F described above exerts the same effects as those of the hybrid devices 1 and 1B-1F described above.

Eighth Embodiment

Figure 11:
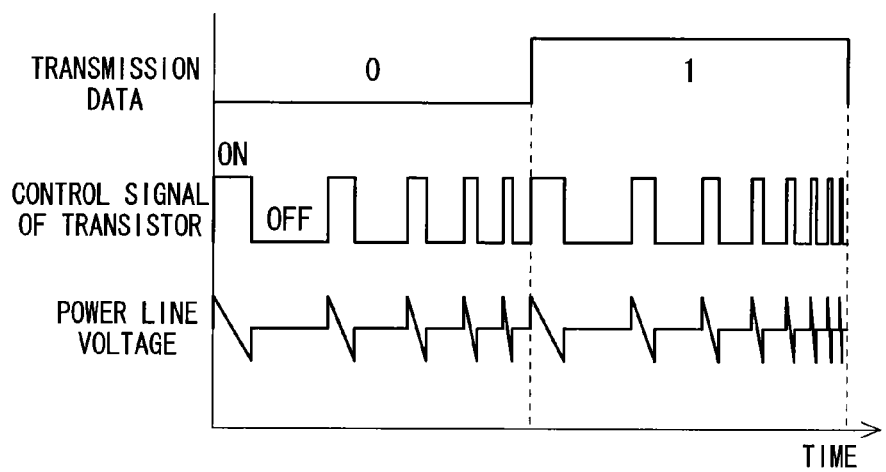
FIG. 11 A waveform chart illustrating an operation of a PLC/power-supply hybrid device according to an eighth embodiment.

FIG. 11 is a waveform chart illustrating an operation of a PLC/power-supply hybrid device 1 (see FIG. 2) according to an eighth embodiment. Although the hybrid device 1 will be described herein, the following description applies to other hybrid devices 1B and the like.

FIG. 11 schematically illustrates waveforms of the control signal of the transistor 31 and the voltage of the power line 5 (see FIG. 1) in a case of transmitting the data "0" and "1". In an example shown in FIG. 11, a so-called chirp waveform is adopted for the control signal of the transistor 31.

The chirp waveform is a waveform in which a frequency (in other words, a cycle) varies linearly with elapse of time. A time factor in a frequency change is called a chirp rate. Although FIG. 11 illustrates a case where the frequency increases with time (so-called up chirp), a case where the frequency decreases with time (so-called down chirp) is also adoptable.

Different rates of change of the frequency are assigned to the data "0" and the data "1". In an example shown in FIG. 11, the rate of increase of the frequency, that is, the chirp rate, of a chirp waveform associated with the data "0" is set lower than that of the chirp waveform associated with the data "1". The chirp rates may be set vice versa.

The control circuit 32 controls the switching of the transistor 31 by means of the chirp signal, and modulates a change of the frequency of the chirp signal in accordance with the transmission data. Thereby, a signal (which is formed by noise occurring due to the switching of the transistor 31 as described above) corresponding to this chirp signal is outputted to the power line 5. On the other hand, data reception can be performed by detecting a change of the frequency, that is, by detecting a change in the cycle, of a signal on the power line 5.

In general, the chirp signal allows communicate with excellent noise tolerance. Therefore, in the hybrid device 1 as well, such an effect is obtained.

<Modification>

Although a case where the power supply circuit 10 (see FIG. 2) or the like is step-down type one has been illustrated above, a power supply circuit of step-up type or step-up/down type may be adoptable.

While the invention has been described in detail, the foregoing description is in all aspects illustrative and not restrictive. It is therefore understood that numerous modifications and variations not illustrated herein can be devised without departing from the scope of the invention.

DESCRIPTION OF THE REFERENCE NUMERALS 1, 1B-1G PLC/power-supply hybrid device
2 main body circuit
3 device with communication function
5 power line
10, 10C, 10F, 10G power supply circuit
20 voltage input terminal
31 switching part
32 control circuit
70, 100 voltage detector
80 voltage output terminal
110 PLC processing circuit
160 transformer
200 characteristic emphasis circuit

The invention claimed is:

1. A PLC/power-supply hybrid device, comprising:
a power supply circuit that performs voltage conversion in which an input voltage applied to a voltage input terminal is converted into a voltage having a predetermined voltage value, and outputs the voltage obtained as a result of the voltage conversion to a voltage output terminal, wherein
said power supply circuit includes:
a switching part that chops a voltage of said voltage input terminal side; and
a control circuit that outputs a control signal to control the chopping by controlling switching of said switching part,
said control circuit is operable in a normal mode and a transmission mode, the normal mode being a mode in which the power supply circuit performs the voltage conversion, and the transmission mode being a mode in which data transmission is performed through power line communication (PLC) using a power line that leads to said voltage input terminal, and
in the transmission mode, said control circuit modulates the switching of said switching part in accordance with transmission data, and
said PLC/power-supply hybrid device further comprises:
a voltage detector connected at said voltage output terminal side relative to a position where said switching part is connected, and configured to detect a voltage corresponding to the input voltage; and
a PLC processing circuit that performs:
a reception data extraction process in which data transmitted from another device to the power line is extracted from the detected voltage detected by said voltage detector, and
an input voltage estimation process in which the input voltage is estimated from the detected voltage based on information given in advance concerning a circuit configuration between said voltage input terminal and said voltage detector,
wherein the reception data extraction process is performed on an estimated voltage obtained as a result of the input voltage estimation process.

2. The PLC/power-supply hybrid device according to claim 1, wherein said control circuit performs the switching in the transmission mode, under a condition that allows the predetermined voltage value, which is generated in the normal mode, to be obtained while performing the modulation in accordance with the transmission data.

3. The PLC/power-supply hybrid device according to claim 1, wherein
said control circuit sets different switching cycles to said switching part between the normal mode and the transmission mode, and
said control circuit sets an ON duration of said switching part such that the ON duration decreases as the switching cycle is shorter.

4. The PLC/power-supply hybrid device according to claim 1, wherein said control circuit performs a feed-back control on the switching based on the detected voltage detected by said voltage detector.

5. The PLC/power-supply hybrid device according to claim 4, wherein
said control circuit performs an output voltage estimation process in which voltage obtained as a result of the voltage conversion is estimated from the detected voltage based on information given in advance concerning a circuit configuration between said voltage detector and said voltage output terminal, and
said control circuit performs a feed-back control on the switching based on an estimated voltage obtained as a result of the output voltage estimation process.

6. The PLC/power-supply hybrid device according to claim 1, wherein
said power supply circuit is an AC-input/isolated power supply circuit that includes a transformer, and
said voltage detector is connected so as to lead to a secondary side of said transformer.

7. The PLC/power-supply hybrid device according to claim 1, wherein said PLC processing circuit performs the reception data extraction process on a portion of the detected voltage corresponding to an ON-period of said switching part.

8. A PLC/power-supply hybrid device, comprising:
a power supply circuit that performs voltage conversion in which an input voltage applied to a voltage input terminal is converted into a voltage having a predetermined voltage value, and outputs the voltage obtained as a result of the voltage conversion to a voltage output terminal, wherein
said power supply circuit includes:
a switching part that chops a voltage of said voltage input terminal side; and
a control circuit that outputs a control signal to control the chopping by controlling switching of said switching part,
said control circuit is operable in a normal mode and a transmission mode, the normal mode being a mode in which the power supply circuit performs the voltage conversion, and the transmission mode being a mode in which data transmission is performed through power line communication (PLC) using a power line that leads to said voltage input terminal, and in the transmission mode, said control circuit modulates the switching of said switching part in accordance with transmission data, and said PLC/power-supply hybrid device further comprising:

a voltage detector connected at said voltage output terminal side relative to a position where said switching part is connected, and configured to detect a voltage corresponding to the input voltage; and a PLC processing circuit that performs a reception data extraction process in which data transmitted from another device to the power line is extracted from the detected voltage detected by said voltage detector, wherein the reception data extraction process is performed on a portion of the detected voltage corresponding to an ON-period of said switching part.

9. The PLC/power-supply hybrid device according to claim 1, further comprising:

a characteristic emphasis circuit that emphasizes a predetermined characteristic of a voltage that is to be inputted to said voltage detector, wherein a characteristic emphasized by said characteristic emphasis circuit is different between an ON state and an OFF state of said switching part.

10. The PLC/power-supply hybrid device according to claim 8, further comprising:

a characteristic emphasis circuit that emphasizes a predetermined characteristic of a voltage that is to be inputted to said voltage detector, wherein a characteristic emphasized by said characteristic emphasis circuit is different between an ON state and an OFF state of said switching part.

11. The PLC/power-supply hybrid device according to claim 1, wherein said control circuit modulates the switching in the transmission mode, in accordance with a chirp signal.

12. The PLC/power-supply hybrid device according to claim 1, wherein a switching frequency in the normal mode is higher than a switching frequency in the transmission mode.

13. A device with communication function, comprising:

the PLC/power-supply hybrid device according to claim 1; and a main body circuit that performs PLC through said PLC/power-supply hybrid device.

14. The PLC/power-supply hybrid device according to claim 8, wherein said control circuit performs the switching in the transmission mode, under a condition that allows the predetermined voltage value, which is generated in the normal mode, to be obtained while performing the modulation in accordance with the transmission data.

15. The PLC/power-supply hybrid device according to claim 8, wherein said control circuit sets different switching cycles to said switching part between the normal mode and the transmission mode, and said control circuit sets an ON duration of said switching part such that the ON duration decreases as the switching cycle is shorter.

16. The PLC/power-supply hybrid device according to claim 8, wherein said control circuit modulates the switching in the transmission mode, in accordance with a chirp signal.

17. The PLC/power-supply hybrid device according to claim 8, wherein a switching frequency in the normal mode is higher than a switching frequency in the transmission mode.

18. A device with communication function, comprising the PLC/power-supply hybrid device according to claim 8; and a main body circuit that performs PLC through said PLC/power-supply hybrid device.

* * * * *